United States Patent [19]

Sudo

[11] 4,269,218
[45] May 26, 1981

[54] ROTARY VALVE

[75] Inventor: Hisashi Sudo, Neyagawa, Japan

[73] Assignee: Kubota Ltd., Osaka, Japan

[21] Appl. No.: 62,051

[22] Filed: Jul. 30, 1979

Related U.S. Application Data

[63] Continuation of Ser. No. 848,769, Nov. 4, 1977.

[51] Int. Cl.$^3$ .......................... F16K 5/04; F16L 58/08
[52] U.S. Cl. .................................... 137/240; 137/375; 251/212
[58] Field of Search ................. 251/212; 139/375, 240

[56] References Cited

U.S. PATENT DOCUMENTS

| | | | |
|---|---|---|---|
| 1,835,891 | 12/1931 | Mildren | 251/212 X |
| 2,159,540 | 5/1939 | MacClatchie | 251/212 X |
| 2,352,799 | 7/1944 | Newton | 137/375 |
| 2,587,704 | 3/1952 | Debo | 251/212 X |
| 2,849,861 | 9/1958 | Gardiner et al. | 251/212 X |
| 3,102,710 | 9/1963 | Dresden | 251/212 X |
| 3,367,359 | 2/1968 | Johnson | 137/375 |
| 3,417,961 | 12/1968 | Shorrock | 251/212 |
| 3,701,359 | 10/1972 | Worley et al. | 137/375 |

FOREIGN PATENT DOCUMENTS 912395 5/1954 Fed. Rep. of Germany .
1055606 10/1953 France ..................................... 251/212

*Primary Examiner*—Arnold Rosenthal
*Attorney, Agent, or Firm*—Armstrong, Nikaido, Marmelstein & Kubovcik

[57] ABSTRACT

A valve comprises a valve case having a fluid passage and a pair of opposed valve plates turnably disposed on the opposite sides of the fluid passage and each having an abrasion resistant lining over the surface thereof facing the fluid passage. Drive means causes the valve plates to perform a symmetric circular motion at the same time. When the abrasion resistant lining surfaces of the valve plates are positioned upright in parallel to each other, the fluid passage is in its fully open state. The fluid passage can be closed by turning the valve plates inward symmetrically with respect to each other and thereby bringing the opposed end edges of the plates into abutting contact with each other at the center of the fluid passage.

2 Claims, 6 Drawing Figures

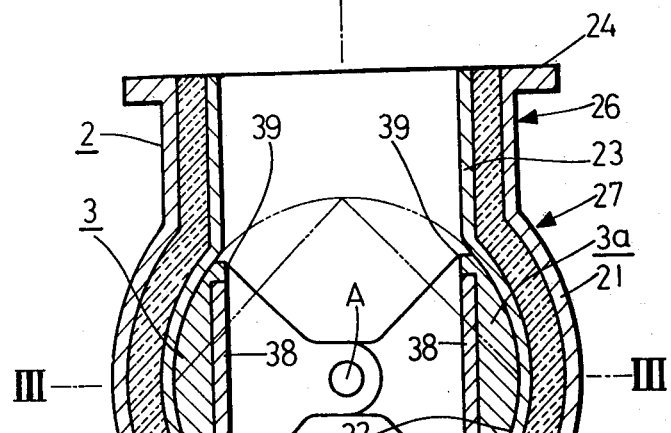
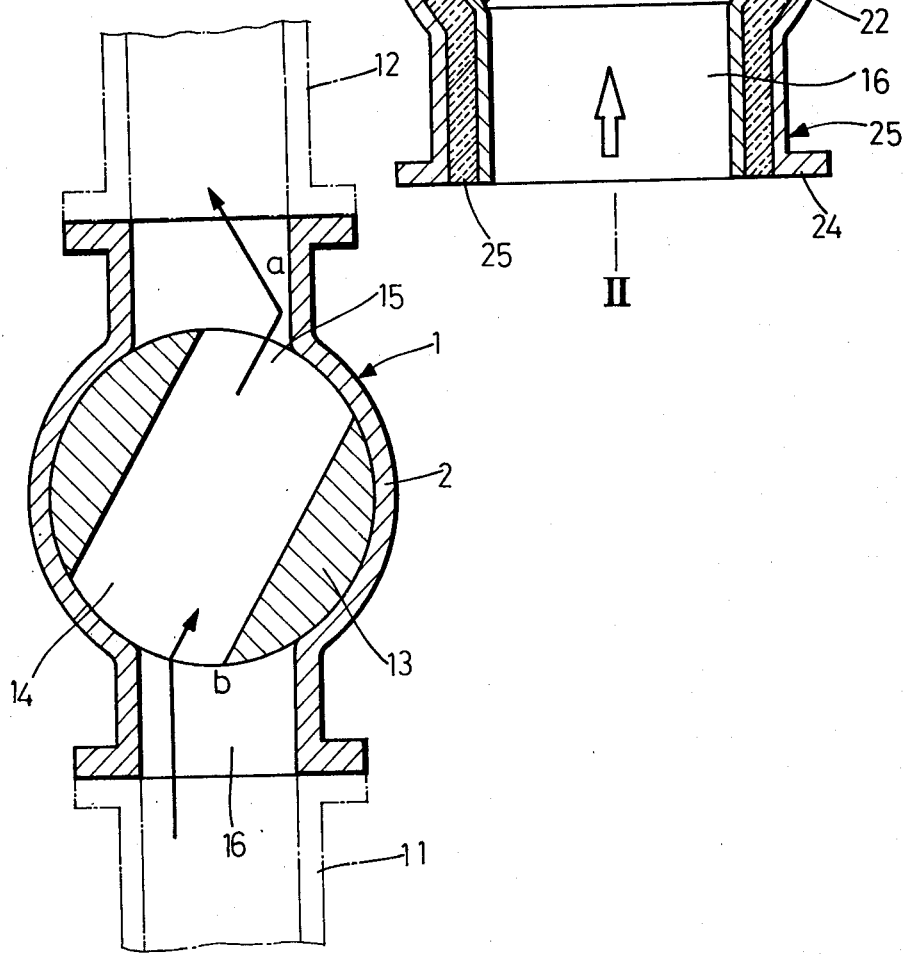
FIG. 1
FIG. 5

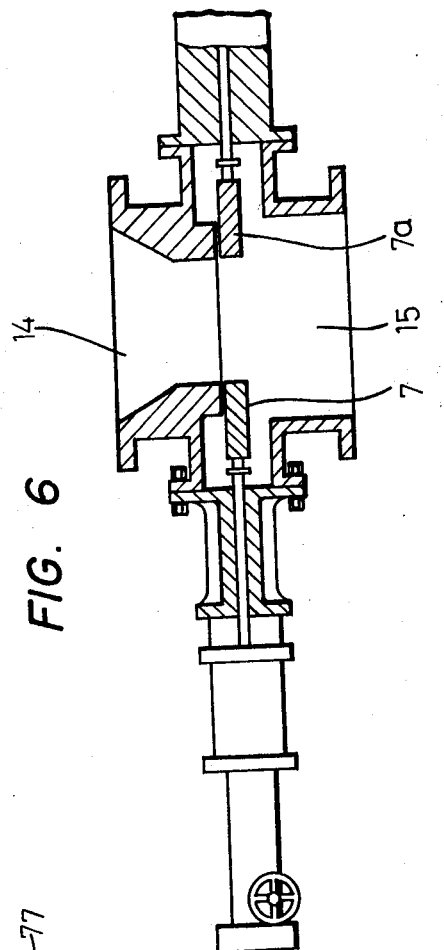
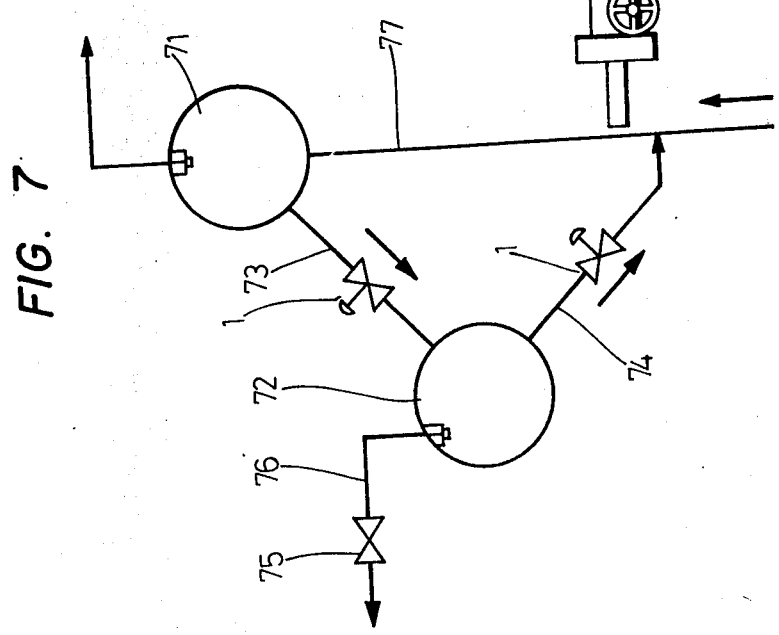

ROTARY VALVE

This is a continuation of application Ser. No. 848,769, filed Nov. 4, 1977.

BACKGROUND OF THE INVENTION

Conventional valves include those used in fluid catalytic cracking systems in petroleum refineries for controlling the flows of gas and powdery catalyst, those installed in pipe channels for conducting dust-containing flue gas from blast furnaces to boilers utilizing the gas pressure, and those used for controlling the flow of gas containing a large amount of particles or dust or the flow of high-velocity fluid.

These valves include rotary valves. With reference to FIG. 5, a rotary valve 1 disposed between pipes 11 and 12 comprises a valve case 2 and a cylindrical valve element 13 provided within the valve case 2. The valve element 13 is turnable through a suitable angle to alter the degree of opening of the fluid passage 16 and to thereby control the flow of the fluid passing through the passage 16. The valve element 13 in the illustrated position has a fluid inlet 14 and a fluid outlet 15 which are out of alignment with the fluid passage 16, causing the fluid to flow as deflected along the arrows shown. The flow of the fluid therefore involves a great pressure loss. Especially since the fluid strikes the inner wall of the valve case 2 and then flows out from the outlet 15, the fluid striking portion a of the inner wall wears away rapidly, consequently reducing the life of the valve. At the inlet side of the valve element 13, the fluid impinging on the peripheral surface of the valve element 13 wears away a portion b of the valve element 13, so that there is the necessity of reinforcing this portion. However, since the peripheral surface of the valve element 13 is adapted for sliding contact with the inner surface of the valve case 2 when the valve element 13 is turned, it is impossible to provide an abrasion resistant lining on the surface of the valve element 13. Thus, the valve element 13 also involves the problem of early wear.

FIG. 7 shows a fluid catalytic cracking (FCC) system in which crude oil, kerosene, gas oil or like heavy oil in the form of vapors is brought into contact with powdery catalyst such as silica alumina at a high temperature within a riser 77 and cracked in a reactor 71. The cracked vapors are further processed to obtain propane gas, olefin gas, high-octane gasoline and other refined products. The particles of the catalyst coated with carbon during use are drawn off from the reactor 71 and returned to a regenerator 72, in which the carbon is burned off. The regenerated catalyst is circulated through the riser 77 again.

The flue gas channel 76 of the regenerator 72 is provided with a pressure difference regulating valve 75 for controlling the discharge of the flue gas as well as the pressure difference between the reactor 71 and the regenerator 72. The line 73 for returning the used catalyst from the reactor 71 to the regenerator 72 and the line 74 for guiding the regenerated catalyst from the regenerator 72 to the riser 77 are provided with flow control valves 1 and 1. Valves heretofore used in the FCC system comprise slidable valve plates 7 and 7a having opposed end edges which are brought into abutting contact with each other at the center position to close the flow passage (see FIG. 6). Since the valve plates are of the slider type, it is impossible to provide an abrasion resistant lining on the sliding portions, so that the valve plates wear away rapidly, reducing the life of the valve. Furthermore, the valve plates, which are adapted to block the flow of the fluid at right angles thereto, produce a marked turbulence leading to increased wear and entail a great pressure loss. The valve is therefore disadvantageous for use in the FCC system in which it is frequently used in its half-open position.

Additionally, since seat rings and guide members which are fastened by bolts or the like are exposed to the fluid, the theaded portions are oxidized, scorched or otherwise damaged owing to the influence of the high temperature, consequently presenting extreme difficulty in removing the parts.

SUMMARY OF THE INVENTION

An object of this invention is to provide a valve comprising a valve case having a fluid passage and a pair of valve plates turnably provided on the opposite sides of the fluid passage, the valve plates being coupled to drive means which causes the valve plates to perform a symmetric circular motion relative to each other to define a fluid passing opening in the center of the fluid passage so that the flow of fluid can be controlled without substantially disturbing the fluid flow.

Another object of this invention is to provide a valve in which the surfaces of the above-mentioned valve plates to be exposed to the fluid are out of sliding contact with the valve case and can be lined with an abrasion resistant material.

BRIEF DESCRIPTION OF THE DRAWINGS

FIG. 1 is a front view in vertical section showing a valve of this invention;

FIGS. 5 and 6 are views in vertical section showing conventional valves, and

FIG. 7 is a schematic diagram showing valves of this invention as used in an FCC system.

DETAILED DESCRIPTION OF THE INVENTION

Figure 2:
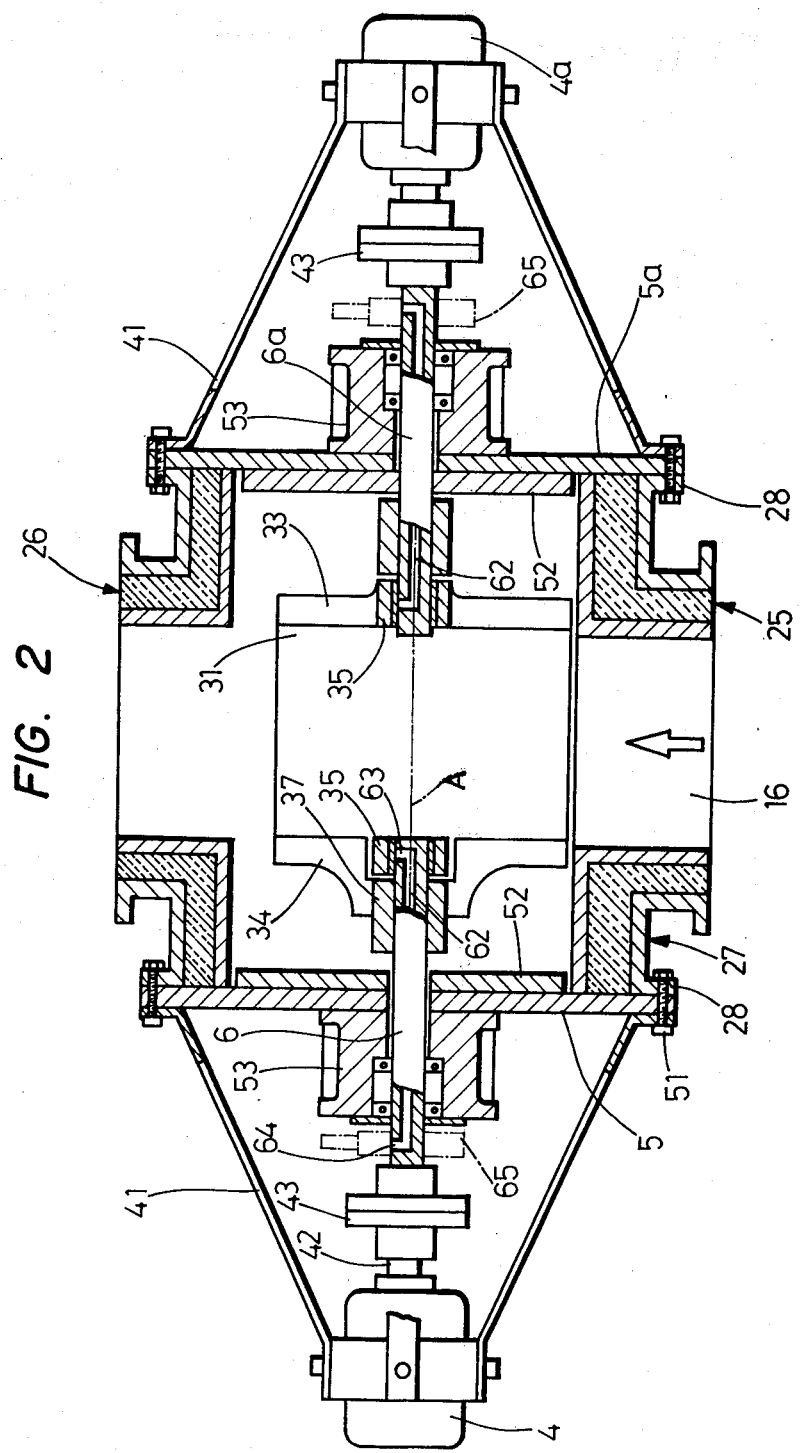
FIG. 2 is a side elevation in vertical section taken along the line II—II in FIG. 1.

A valve comprises a valve case 2 having a fluid passage 16 of circular cross section and a valve element composed of a pair of valve plates 3, 3a and fitting in the fluid passage 16. The valve plates 3, 3a are coupled to drive means 4, 4a which cause the valve plates to perform a symmetric circular motion to thereby control the degree of opening of the passage.

The valve case 2 is constructed of an outer wall 21 of steel plate lined with a refractory 22 such as a high-alumina castable having high resistance to abrasion and an inner wall 23 of heat resistant metal plate to be exposed to a fluid. The valve case 2 has at its opposite ends a cylindrical fluid inlet 25 and a similar fluid outlet 26 having flanges 24 respectively. The central portion of the valve case 2 is outwardly bulged in the form of a circular arc to provide a valve element fitting portion 27.

The valve plates 3, 3a are disposed on the opposite sides of the fluid passage 16 in opposed relation to each other and have planar inner surfaces 31 facing the fluid passage 16 and having a lateral width approximately equal to the diameter of the passage. The valve plates 3, 3a have circular arc rear surfaces 32 centered about a line A intersecting the center axis of the passage 16 at right angles. Each of the valve plates 3, 3a has at the opposite ends of the inner surface 31 a pair of parallel support arms 33 and 34 spaced apart by a distance equal to the diameter of the fluid passage 16 and each extending at a right angle to the inner surface 31 to the intersecting line A at right angles. The support arm 33 is formed at its end with a bearing portion 35 having a bush fitting therein. The other support arm 34 has a distal end which is positioned laterally outward from its base portion by a distance corresponding to the bearing portion 35. The distal end is provided with a boss 37 having a bore 36 in alignment with the intersecting line A.

Each of the valve plates 3, 3a is made of a heat resistant metal material such as SCPH 61 and lined with a metal such as Stellite over the inner surface 31 on which the fluid impinges as well as over the inner surfaces of the support arms 33, 34 to provide an abrasion resistant layer 38.

The valve element fitting portion 27 of the valve case 2 is in the form of a cylinder with an axis in alignment with the intersecting line A. The fitting portion 27 is provided at its opposite ends with flanges 28, 28 to which side walls 5, 5a are detachably secured by bolts 51. Each of the side walls 5, 5a has a heat resistant protective plate 52 over its inner surface and is provided at the center of its outer surface with bearing means 53 having a bearing and a seal. The side wall and the protective plate 52 has a center bore in alignment with the intersecting line A. Shafts 6, 6a extend through the bores and are rotatably supported by the bearing means 53 on the opposite sides respectively.

Figure 3:
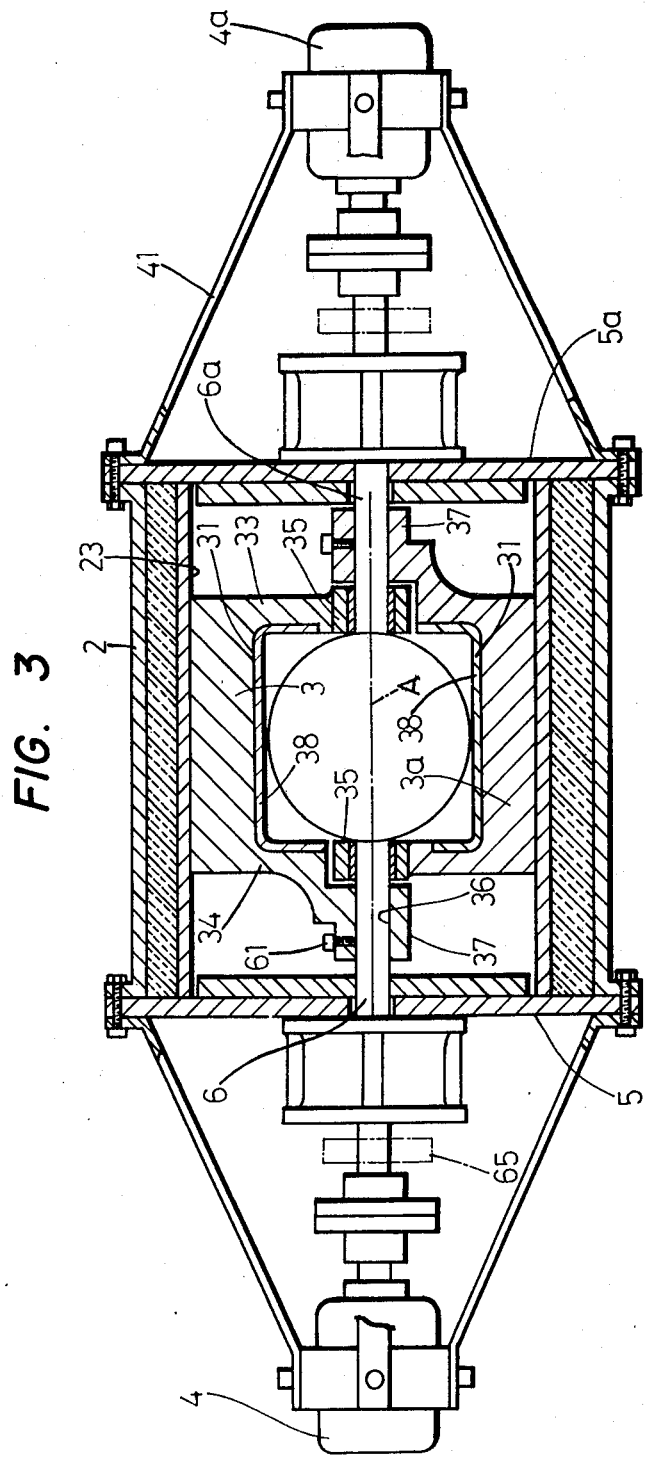
FIG. 3 is a plan view in horizontal section taken along the line III—III in FIG. 1.

The pair of shafts 6, 6a are disposed on the opposite sides of the fluid passage 16 in opposed relation to each other and in alignment with the intersecting line A. The pair of the valve plates 3, 3a are opposed to each other as shown in FIG. 3. The boss 37 of one valve plate is positioned adjacent the bearing portion 35 of the other valve plate, and the bearing portion 35 of the former valve plate and the boss 37 of the latter valve plate are positioned side by side. Thus the bore 36 of the boss 37 and the bearing bore of the bearing portion 35 are aligned to provide a communicating shaft bore on each side of the center of the fluid passage. One end of each of the shafts 6, 6a is inserted in the shaft bore and fastened to the boss 37 with a bolt 61. The shaft is supported by the bearing portion 35 freely rotatably. Accordingly, one of the shafts 6, 6a is secured to one of the valve plates 3, 3a to drive that valve plate, permitting free rotation of the other valve plate. Each of the shafts 6, 6a is formed with a channel 62 extending centrally therethrough and having one end 63 opened in the bearing portion 35 of the valve plate and the other end 64 opened in the peripheral surface of the shaft outside the bearing means 53 as shown in FIG. 2. The other end opening of the channel 62 is covered with closing means 65 and communicates with pressure air source or steam source (not shown). Compressed air or steam is injected into the bearing portion 35 at the shaft end through the closing means 65 and the channel 62 to prevent ingress of the dust in the fluid into the bearing portion 35.

The pair of drive means 4, 4a are respectively mounted on the side walls 5, 5a of the valve case 2 by means of brackets 41. The drive shafts 42 of the drive means 4, 4a are connected to the outer ends of the shafts 6, 6a by couplings 43 respectively. Under the control of unillustrated control means, the drive means 4, 4a are reversibly rotatable by the same amount at the same time in opposite directions to each other.

Thus, the rotation of the shafts 6, 6a causes the two valve plates 3, 3a to perform a symmetric circular motion through the same angle in either positive or reverse direction. When the valve plates 3, 3a are in their full-open position with their inner surfaces 31 in upright position in parallel to each other, the fluid flowing into the valve case 2 through the inlet 25 passes through a passage of square cross section defined by the pair of valve plate inner surfaces 31 and by the support arms 33, 34 on the opposite sides and flows out from the outlet 26.

When the two drive means 4, 4a operate to turn the valve plates 3, 3a at the same time, the inner surfaces 31 incline inward symmetrically with respect to each other, projecting the end edges 39, 39 of the valve plates into the flow passage, with the result that the flow passage is constricted to a size defined by the end edges 39, 39 for the control of the flow of the fluid. Since the opening defined by the end edges 39, 39 is positioned in the center of the fluid passage, and since the inner surfaces 31, 31 of the valve plates are inclined and projected into the passage thereby forming a throat when the valve is progressively closed from its open position, no turbulence will occur in the fluid but the fluid is allowed to flow in a constant direction free of the deflection heretofore encountered. Although the inner surfaces of the valve plates 3, 3a are subjected to frictional resistances owing to the impingement of the flow of the fluid thereon, the inner surfaces 31, which are protected by the abrasion resistant layers 38, are almost free of any abrasion. Moreover, the abrasion resistant layers 38 on the valve plates 3, 3a are serviceable over a prolonged period of time free of damage, because they are out of sliding contact with the inner surface of the valve case 2 over the entire range of movement of the valve plates 3, 3a from their full-open position to completely closed position.

For the inspection or repair of the valve element, the drive means 4, shaft 6 and valve plate 3 are removable as a unit from the valve case 2 merely by detaching the side wall 5 from the case with the valve connected to the piping system. This ensures great savings in labor and is therefore advantageous as compared with conventional valves which must be wholly removed from the piping system.

Figure 4:
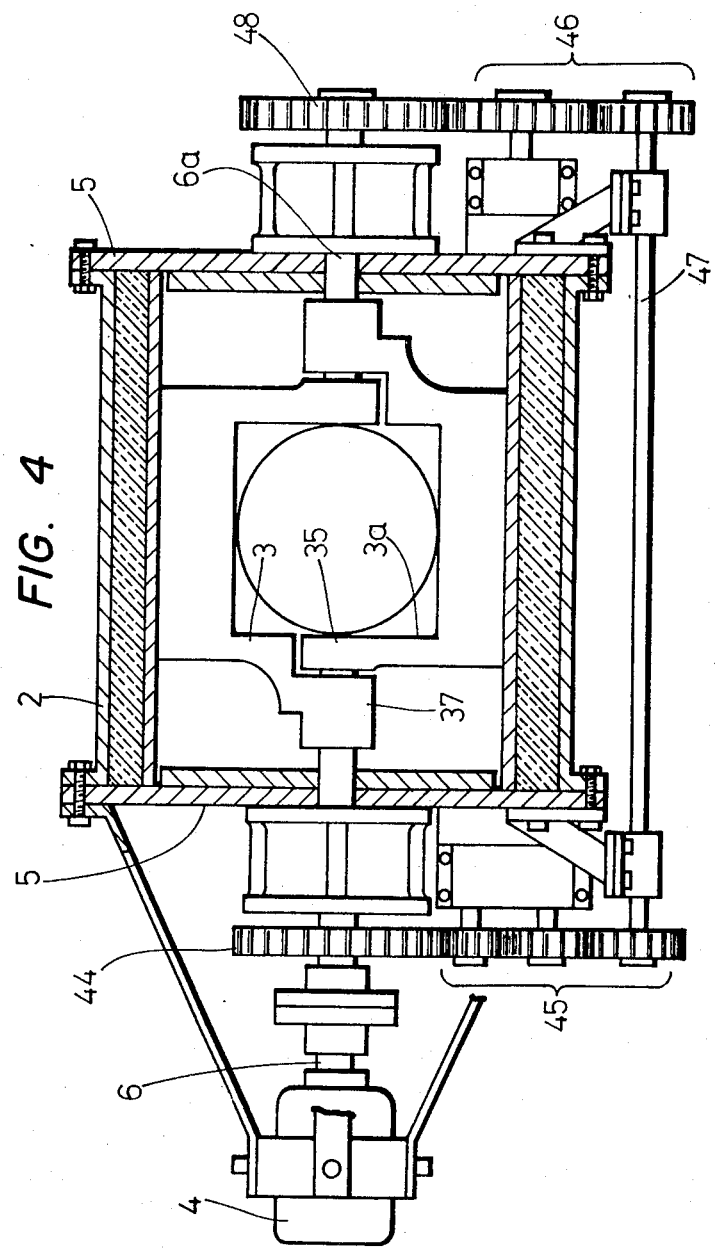
FIG. 4 is a plan view in horizontal section showing another valve embodying this invention.

FIG. 4 shows another embodiment of this invention in which only one drive means 4 is provided on the side wall 5 of the valve case 2. One shaft 6 connected to the drive means 4 carries a gear 44 which, through a coupling mechanism 47 including trains of gears 45, 46, is associated with a gear 48 on the other shaft 6a. The reversible rotation of the shaft 6 is transmitted to the shaft 6a to drive the shaft 6a in a reverse direction to but by the same amount as the shaft 6.

Although the present invention has been described above with respect to a fluid which flows into the valve from the inlet 25 as indicated by an arrow in FIG. 1, the fluid can be passed in the reverse direction to the above from the outlet 26, if it is nonabrasive and the valve plates 3, 3a need not be provided with a metal lining.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A rotary valve, including a valve case having a fluid passage and a valve element disposed in the fluid passage and operative to control the degree of opening of the passage, comprising:

side walls removably attached to the valve case, a pair of valve plates turnably disposed on the opposite sides of the fluid passage in opposed relation to each other and constituting the valve element, each of the valve plates being provided at its opposite ends with support arms extending toward the fluid passage, and drive means mounted on an outer side of the valve case and coupled to the valve plates for causing the valve plates to perform a symmetric circular motion, said drive means comprising a pair of rotary shafts, each of said rotary shafts being formed with a channel extending centrally therethrough and having one end open to a boss of a respective rotatably and slidably supported arm and the other end open to a peripheral surface of the shaft outside the wall, the outer opening being covered with closing means communicating with one of a pressure air source or steam source, said shafts being rotatably supported on a valve case, side walls extending coaxially toward the fluid passage at right angles to the center axis of the fluid passage, one support arm of each valve plate being coupled to an outer portion of a respective one of the drive shafts and the other support arm of each valve plate being rotatably and slidably supported on an inner portion of the opposing rotary shaft of the other side respectively side-by-side with the coupled support arm of the opposing valve plate.

2. A rotary valve, including a valve case having a fluid passage and a valve element disposed in said fluid passage and operative to control the degree of opening of said passage, comprising:

a valve case comprising an outer and an inner wall, said valve case including a valve element fitting portion in the form of two laterally opposed arcuate indentations in said inner wall;

side walls removably attached to said valve case;

a pair of valve plates turnably disposed on opposite sides of said fluid passage in opposed relation to each other and constituting the valve element, said plates having planar inner surfaces facing said fluid passage provided with abrasive, resilient lining running parallel to each other and to said inner wall when said valve is in a fully opened position, and having rear surfaces which fit flush against said indentations such that said fluid passage is unobstructed by said planar surfaces, said plates being positioned within said indentations when said valve is in a fully opened position, each of said valve plates being provided at its opposite end with support arms, said arms positioned perpendicular to said inner surfaces of said plates and being positioned outside said fluid flow; and drive means mounted on an outer side of said valve case and fixed to said valve plates for causing said valve plates to perform a symmetrical circular motion, said drive means comprising a pair of rotary shafts rotatably supported on said valve case side walls extending coaxially toward said fluid passage, one support arm of each valve plate being fixed to an outer portion of a respective one of said rotary shafts and said other support arm of each valve being rotatably and slidably supported on an inner portion of the opposing rotary shaft of the other side, respectively, side-by-side with the coupled support arm of the opposing valve plate.

* * * * *